Feb. 14, 1939.  W. B. EWING  2,147,431

PIPE JOINT AND METHOD OF MAKING SAME

Filed June 16, 1936  2 Sheets—Sheet 1

INVENTOR
Wylie B. Ewing
by his attorney

Feb. 14, 1939.                W. B. EWING                2,147,431
                     PIPE JOINT AND METHOD OF MAKING SAME
                     Filed June 16, 1936          2 Sheets-Sheet 2

INVENTOR
Wylie B. Ewing
by
his attorney

Patented Feb. 14, 1939

2,147,431

UNITED STATES PATENT OFFICE 2,147,431

PIPE JOINT AND METHOD OF MAKING SAME

Wylie B. Ewing, Wheeling, W. Va., assignor by mesne assignments, to Vulcan Rail and Construction Company, Maspeth, N. Y., a corporation of New York Application June 16, 1936, Serial No. 85,483

3 Claims. (Cl. 29—157)

This invention relates broadly to pipe joints and methods of making the same, and more particularly to pipe joints of the type especially adapted for use in pipe railing. It relates still more particularly to composite pipe joints such as elbows comprising a plurality of pieces of pipe. Still more specifically, the invention contemplates a composite multiple elbow or pipe joint for use in joining together in angular relationship more than two pieces of pipe. Novel methods of producing such joints and elbows are provided.

Pipe railing, and especially welded pipe railing, has recently come into wide use due in considerable measure to certain improvements which I have made in the fabrication of such railing, which improvements form the subject matter of copending applications. This application discloses a pipe joint or elbow structure and a method of making such a structure which is ideally suited for use with the pipe railing disclosed in my said copending applications. My pipe joint or elbow is easily and simply fabricated at low cost, the parts thereof are easily assembled and connected together either in the shop or in the field, a very strong and rigid structure is provided and the elbow is of exceptionally pleasing appearance. The word "elbow" is used herein as a word of definition and not of limitation and comprehends broadly a joint between two or more pieces of pipe.

Other details, objects and advantages of the invention will become apparent as the following description of certain present preferred embodiments thereof and certain present preferred methods of practicing the same proceeds.

In the accompanying drawings I have shown certain present preferred embodiments of the invention and have illustrated certain present preferred methods of practicing the same, in which Figure 1 is an elevational view of a portion of a piece of pipe indicating the manner in which it may be cut or severed in the production of an elbow;

Figure 12 is a central vertical cross-sectional view through a portion of a partly formed pipe elbow;

Figure 13 is a view of a cap member in the shape of a spherical segment and which is the equivalent of half the cap member shown in Figure 7;

Figure 14 is a top plan view of the partly formed elbow as shown in Figure 12 with the cap member of Figure 13 applied thereto;

Figure 15 is a diagrammatic view illustrating the cutting of a piece of pipe for assembly with the partly formed elbow shown in Figure 14;

Figure 16 is a diagrammatic view of the piece of pipe shown in Figure 15 when viewed from above;

Figure 17 is a top plan view of a multiple pipe joint or elbow formed by assembly of the piece of pipe shown in Figures 15 and 16 with the partly formed elbow shown in Figure 14;

Figure 18 is a vertical cross-sectional view through the finished elbow shown in Figure 17;

Figure 19 is an elevational view of another form of pipe elbow or T;

Figure 20 is a vertical cross-sectional view through a multiple elbow or T formed from that shown in Figure 19;

Figure 21 is a top plan view of the multiple elbow or T shown in Figure 20;

Figure 22 is a diagrammatic view illustrating the cutting of a piece of pipe for forming the elbow of Figures 20 and 21;

Figure 23 is a central vertical cross-sectional view through the piece of pipe shown in Figure 22;

Figure 24 is a central vertical cross-sectional view taken on the line XXIV—XXIV of Figure 20; and Figures 25, 26 and 27 are diagrammatic views, partly in central longitudinal cross section, showing various forms of cap members applied to pipe railing or posts.

Figure 1:
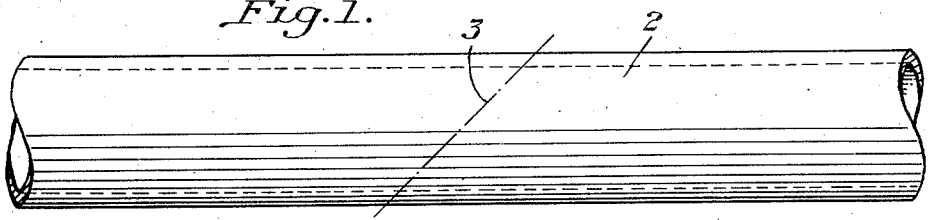
Figure 2:
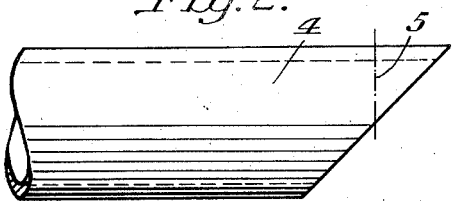
Figure 2 is a view of a portion of the piece of pipe shown in Figure 1 after the latter has been cut and indicating how such portion may further be cut.
Figure 3:
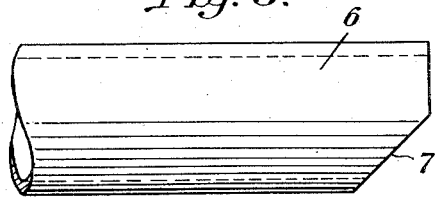
Figure 3 is a view showing the pipe portion of Figure 2 after a further severing or cutting thereof.
Figure 4:
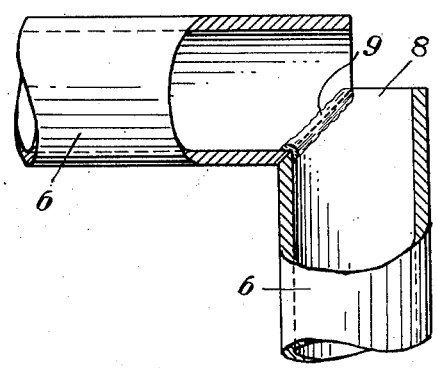
Figure 4 is an elevational view, partly in central vertical cross section, of a partly formed pipe elbow.
Figure 5:
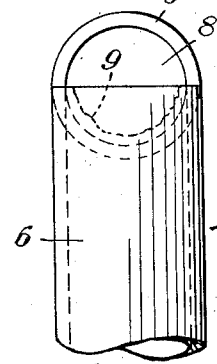
Figure 5 is an elevational view of the partly formed elbow shown in Figure 4 but viewed from the right-hand side of such figure.
Figure 6:
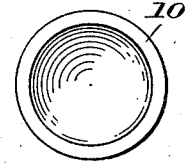
Figure 6 is a plan view of a hollow metal hemisphere.
Figures 7, 8:
Figure 7 is a plan view showing a cap member in the form of half the hemisphere shown in Figure 6.
Figure 8 is an end view of the cap member shown in Figure 7.
Figure 9:
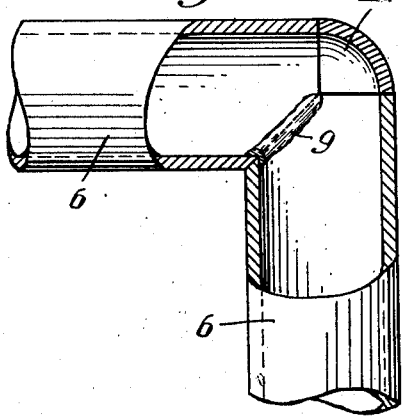
Figure 9 is an elevational view, partly in central vertical cross section, through the assembled elbow.
Figure 10:
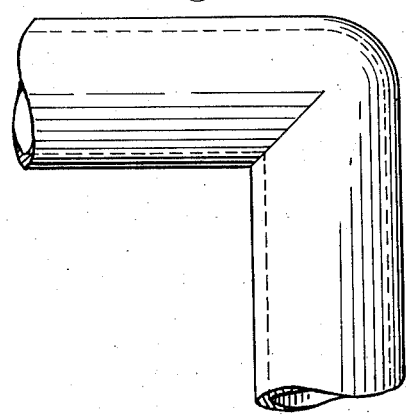
Figure 10 is an elevational view of the completed elbow.
Figure 11:
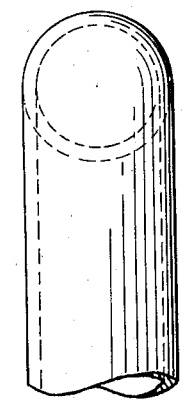
Figure 11 is an elevational view of the completed elbow shown in Figure 10 viewed from the right-hand side of such figure.

Referring now more particularly to the drawings, and, first, to Figures 1 to 11, inclusive, thereof, there is shown in Figure 1 a piece of pipe 2, which may be of any ordinary construction, such, for example, as cast iron or steel pipe, and which may be of any desired length. The piece of pipe 2 is cut or severed completely through in a plane perpendicular to the paper and designated by the chain line 3. This cutting provides two identical pieces of pipe 4 as shown in Figure 2. Each of the pieces 4 is again severed, as indicated at 5, in a plane perpendicular to the axis of the piece and passing through the intersection of such axis with the plane of the original cut, thus producing two identical pieces of pipe 6 as shown in Figure 3. These pieces of pipe 6 are assembled as shown in Figure 4 with their inclined end face portions 7 in contact as shown. An opening 8 is provided at the outer corner of the assembly or partly formed elbow and through such opening the pieces 6 are welded together internally thereof as shown at 9. A metal hemisphere 10 is provided which is severed through a diameter and perpendicularly to its face whereby to provide a cap member 11 in the form of half of a hemisphere as shown in Figures 7 and 8. The radius of curvature of the cap member 11 is preferably substantially the same as the radius of the pipe. The cap member 11 is applied to the partly formed elbow shown in Figure 4 and so as to close the opening 8 and conceal the welding 9 from the exterior of the elbow. The cap member 9 may be connected with the other portions of the elbow in any appropriate manner, as, for example, by welding. If the pieces of pipe 6 are short enough this welding may also be effected internally of the elbow, although it is satisfactory to weld the cap member to the remainder of the elbow from the outside and this is ordinarily done, especially when the pieces of pipe are so long as to render difficult welding through the bore of one of them. When the cap member 11 is welded to the members 6 externally the external weld is ground and polished so that the finished elbow has substantially the appearance of the elbow shown in Figures 10 and 11.

It will be appreciated that in the embodiment of the invention above described, as well as in those presently to be described and others, the angle of the joint or elbow may be more or less than 90° and the same principles of construction apply. The elbows herein disclosed have been shown as being formed at an angle of 90° because this is perhaps the most usual angle actually employed.

Referring now to Figures 12 to 18, inclusive, there is shown in such figures a multiple elbow or pipe joint in which pieces of pipe 12, which may be substantially identical with the pieces 6 shown in Figure 4, are provided and are cut and assembled as above described in connection with Figures 1 to 4, inclusive. A cap member 13 as shown in Figure 13 is provided, such cap member being equal to half of the cap member 11. In Figure 14 the cap member 13 is shown as having been applied to the partly formed elbow comprising the pieces of pipe 12, the cap member 13 covering only half of the space between the outer ends of the pieces of pipe 12. The cap member 13 may be attached to the partly formed elbow in any suitable manner, as, for example, by welding either externally or internally.

Another piece of pipe 14 shown in Figures 15 and 16 is provided and is cut to fit with the assembly shown in Figure 14. This cutting is accomplished by boring halfway through the piece 14 at right angles to one another and perpendicularly to and intersecting the axis of the pipe two holes each having a diameter equal to the external diameter of the pipe, the centers of such holes being on the end edge of the pipe, as clearly indicated by the chain lines in Figures 15 and 16. The end of the piece 14 is thus shaped to enable it to be fitted snugly to the assembly shown in Figure 14 to form a finished elbow, as shown in Figures 17 and 18. The pipe 14 may be connected with the assembly shown in Figure 14 in any preferred manner, as, for example, by welding internally of the elbow as shown at 15. Although I have described the cap member 13 as being applied to the assembled pieces 12 prior to application of the piece 14, the piece 14 may be applied first and the cap member 13 afterward, thus enabling welding of the piece 14 and the pieces 12 at least partly through the opening which in the finished elbow is covered by the cap member 13.

In Figure 19 is shown a pipe joint or elbow in the form of a T and comprising a cross member 16 and an upright member 17, the upper extremity of the latter having a hole bored therethrough at right angles to its axis and with the axis of the hole intersecting the axis of the pipe 17, the diameter of such hole being equal to the external diameter of the pipe. This enables the upper extremity of the pipe 17 to fit about the pipe 16, as shown in Figures 19 and 24.

Another piece of pipe 18 is bored to enable it to fit to the T shown in Figure 19, this being done by boring completely through the pipe 18 perpendicularly to the axis thereof a hole whose diameter is equal to the external diameter of the pipe, the axis of such hole intersecting the axis of the pipe, and also boring through one side only of the wall of the pipe 18 a hole of the same size whose axis intersects the axis of the pipe at right angles to such axis and at right angles to the first mentioned hole, the axes of both holes intersecting the axis of the pipe at the same point. This adapts the piece 18 to be fitted snugly to the assembly shown in Figure 19, whereupon it may be welded thereto, as, for example, by welding 19 within the piece 18.

Figures 25, 26 and 27 show, respectively, cap members adapted for application to the ends of pipes for railing and like structures. In Figure 25 a pipe 20 has applied and welded to the end surface thereof a cap 21 in the shape of a hemisphere whose radius is the same as the radius of the pipe. In Figure 26 a pipe 22 has a plug 23 inserted into its end and welded thereto at 24. The end of the plug may be spherically curved.

In Figure 27 there is shown a pipe 25 having applied thereto a hemispherical cap 26 welded to the pipe at 27.

While I have shown and described certain present preferred embodiments of the invention and certain present preferred methods of practicing the same, it is to be distinctly understood that the invention is not so limited but may be otherwise variously embodied and practiced within the scope of the following claims.

I claim:

1. A method of making a composite pipe joint for joining at least three pipes, comprising providing a plurality of pieces of pipe shaped to fit together non-coaxially in desired angular relationship and to provide an opening at the joint therebetween when said pieces are assembled, assembling said pieces, through said opening welding said pieces together, cutting another piece of pipe so as to fit against the assembly of said first mentioned pieces of pipe and in non-coaxial relationship with each thereof, and fitting said other piece of pipe to said assembly and connecting the same therewith.

2. A method of making a composite pipe joint, comprising cutting a pipe transversely therethrough at an acute angle to the axis of the pipe, cutting off the ends of the pieces of pipe thus obtained each at right angles to the axis of the piece and through the intersection of such axis and the plane of the first mentioned cut, fitting and abutting together the inclined faces of such pieces to form a joint with an opening therein, welding together said faces internally through said opening and covering said opening.

3. A composite pipe joint, comprising a pair of pieces of pipe each having a portion only of an end surface thereof inclined with respect to the axis of the piece, said respective portions being disposed in face to face relationship, and so as to leave a space at the outer corner of the joint, said portions disposed in face to face relationship being welded together through said space and a spherically curved cap member whose radius of curvature is substantially the same as the radius of the pipe closing the outer corner of the joint.

WYLIE B. EWING.